May 22, 1951 W. A. PHELPS 2,554,153
TELEPHOTOGRAPH SYSTEM, INCLUDING A PILOT GAIN CONTROL CHANNEL
Filed April 14, 1948
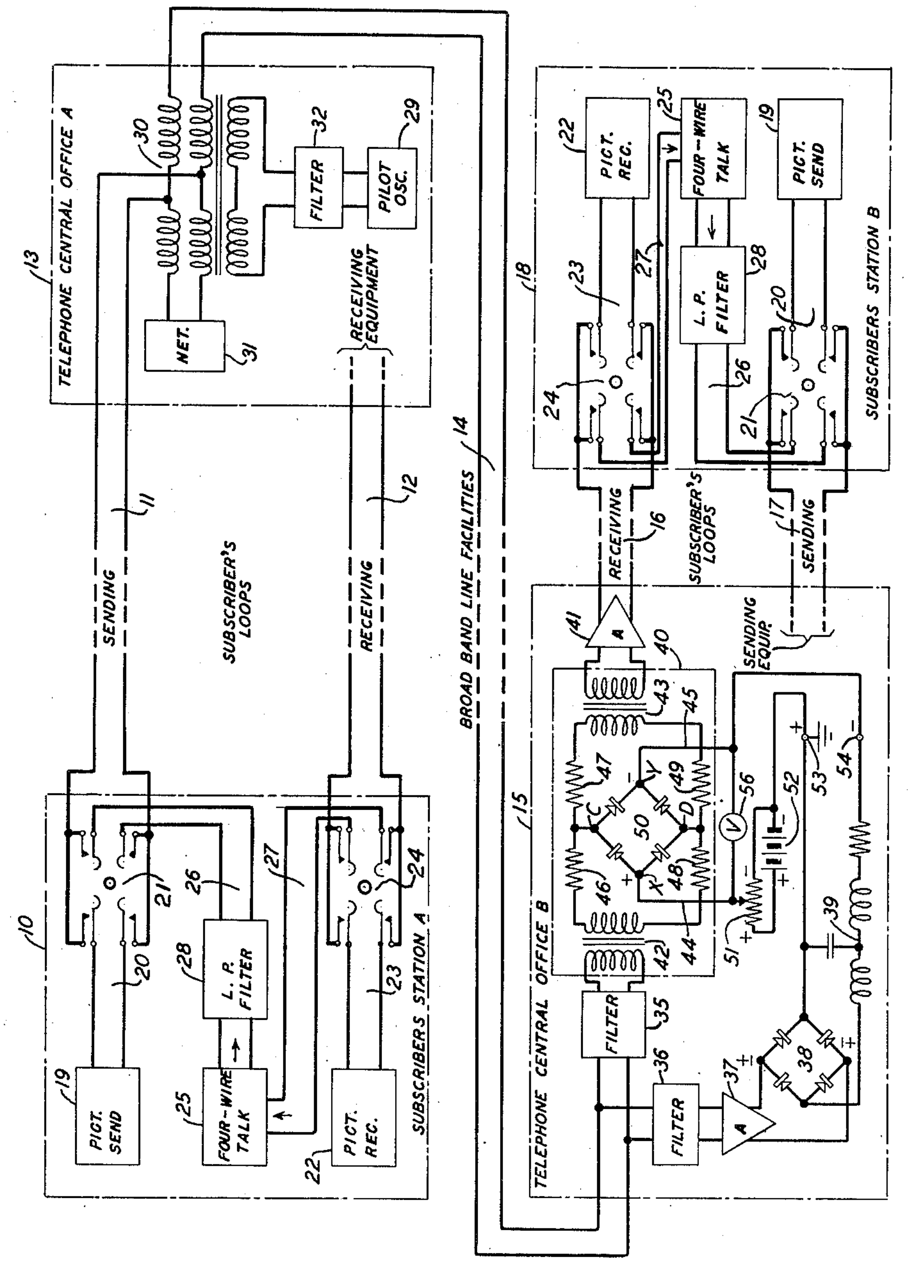
INVENTOR
W. A. PHELPS
BY
Stanley B. Kent
ATTORNEY Patented May 22, 1951 2,554,153

UNITED STATES PATENT OFFICE 2,554,153

TELEPHOTOGRAPH SYSTEM, INCLUDING A PILOT GAIN CONTROL CHANNEL

Walter A. Phelps, Madison, N. J., assignor to Bell Telephone Laboratories, Incorporated, New York, N. Y., a corporation of New York Application April 14, 1948, Serial No. 21,077

6 Claims. (Cl. 178—5.6)

This invention relates to a system of signal level control in telephotography.

An object of the invention is to provide an improved system for controlling the energy level of a picture carrier wave in a telephotograph system.

In a particular telephotograph system comprising a large number of terminal stations located at geographically widely separated points interconnected by wire transmission facilities the problem of interference becomes increasingly great. In a system of telephone transmission covering generally the whole United States, broad-band transmission facilities are used for the long haul services. In these broad-band facilities, various measures have been taken to guard against disturbances which adversely affect the quality of transmission of signals thereover. The protective devices employed function satisfactorily with respect to telephone transmission such as voice and program, the ultimate receiver for which is the human ear. However, when telephotograph signals are being transmitted over these long circuits, it becomes necessary to guard against disturbances which adversely affect the quality of the received pictures. Disturbances which cause sudden signal level changes of as little as 0.1 db (decibal) can be detected in the received picture if they occur in an area of flat gray tones. Sudden signal level changes larger than 0.2 db will generally be objectionable.

Transmission facilities which are available and being used to some extent in the United States for telephotographic transmission have been described in publications. A comprehensive description of available facilities is given by Mr. E. H. Colpitts in the Bell System Technical Journal for April 1937 beginning on page 119 under the title "Recent Trends in Toll Transmission in the United States." The facilities have been extended since 1937. In this description, three broad-band systems are discussed. One of these systems is for application on telephone toll cables of the kind long in use, such as No. 19 gauge paper insulated toll cables. This system utilizes frequencies up to 60 kc. (kilocycles per second) and is now known as the type K carrier system. A second system is for application on open-wire telephone circuits so as to secure more telephone channels on any given pair. This system utilizes frequencies from 35 kc. to 140 kc. and is now known as the type J carrier system. A third system is for application on coaxial cables which have come into use rather recently. This system provides a very large number of telephone circuits, originally 240 for a million-cycle band, and is now known as the type L carrier system.

It is obvious that in these broad-band systems the gain at each repeater station cannot be controlled by any one telephone channel exclusively. The problem of maintaining the signal level constant to the degree necessary for satisfactory telephotograph reception is enormously increased. Some of the disturbances encountered are due to level changes produced by the transmission regulators which are disturbed by ringing current, switchhook transients and high level talkers in other channels. As noted hereinbefore, these disturbances are not noticeable for the talking and program transmissions but are noticeable in the received pictures of telephotograph transmissions.

In the broad-band systems, groups of telephone circuits are transmitted over the cable or wire facilities together. At the telephone central offices, in which the broad-band facilities terminate, the several telephone circuits of the group are selected and connected with transmission facilities individual to the several circuits. Equipment according to applicant's invention is located at such central offices and is associated with and is individual to the telephone loop assigned to telephotograph transmission. A typical broad-band system of the kind just referred to is shown in Fig. 11 of the Colpitt's publication which is a schematic representation of a broad-band cable carrier system providing twelve channels in each direction. This is a typical type K system.

A typical telephotograph equipment with which applicant's invention may be used, is described by Mr. F. W. Reynolds in the Bell System Technical Journal for October 1936 beginning on page 549 under the title "A New Telephotograph System." By means of this system, pictures up to 11 inches by 17 inches may be transmitted by scanning 100 lines per inch with a velocity of 20 inches per second to produce a signal band of 1200 cycles (cycles per second) to 2600 cycles which includes the carrier of 2400 cycles and the so-called single sideband. At the receiver this signal band is utilized to produce a picture by means of a photographic emulsion. As noted hereinbefore, if the received level of this signal varies suddenly by as small an amount as 0.2 db, objectionable effects in the received picture may be produced.

By the use of applicant's invention, considerably larger variations in signal level than 0.2 db at the receiving terminal central offices of the broad-band facilities are compensated so that deleterious changes of tone in the received picture are prevented. In an illustrative embodiment of the invention, a pilot-controlled forward-acting gain control device operating on the picture modulated carrier at the receiving terminal of a broad-band transmission facility is employed. A pilot of constant amplitude and a frequency close to and above the picture modulated carrier band, for example 3145 cycles, is transmitted over the same channel as the picture modulated carrier. At the receiving telephone central office, the pilot is selected by a filter, rectified in a copper oxide rectifier, passed through a low pass filter and, in cooperation with a biasing potential, controls a variable attenuator having copper oxide elements located in the picture modulated carrier channel to maintain the ratio of the amplitudes of the received and transmitted picture modulated carrier substantially constant at all times during the production of a picture, that is to say, any change in received picture current level which is due to changes in the transmission medium between the sending and receiving central offices is compensated for.

A advantage of applicant's system is that the transmission level controlling apparatus may be located at a central office of the telephone system where it may be maintained and supervised at minimum cost. The band width of the transmission channel need be no greater than that ordinarily provided for talking channels. The telephotograph channel may be used for one way or two way talking communication with a minimum of switching, in fact with no more switching than is already provided in the system described by Mr. Reynolds and identified hereinbefore. The cost of the equipment is small, relative to that required for accomplishing the same or equivalent results by other means.

The invention will now be described more in detail having reference to the accompanying drawing consisting of a single figure.

Referring now to the drawing, telephotograph equipment at a subscriber's station 10 is connected by subscriber's loops 11 and 12 to a telephone central office 13 at which one terminal of a broad-band transmission facility 14 is located at a telephone central office 15. Telephone central office 15 is connected by subscriber's loops 16 and 17 with a subscriber's station 18 at which other telephotograph equipment is located which is adapted to work with the equipment at subscriber's station 10.

At subscriber's station 10, a telephotograph sending equipment 19 is adapted to be connected by conductors 20 through switching contacts 21 to subscriber's loop 11. A telephotograph receiving equipment 22 is adapted to be connected by conductors 23 through switching contacts 24 to subscriber's loop 12. The telephotograph sending and receiving equipment may be of any suitable kind producing and utilizing signal currents in the voice frequency range such for example as that described in the Reynolds publication supra. For two-way telephone communication over the telephotograph circuit during intervals between picture transmissions, a four-wire talking set 25 may be connected by conductors 26 and 27 through switching contacts 21 and 24 to the subscriber's loops 11 and 12 respectively. The switching contacts 21 and 24 may be elements of a telephone key. A low pass filter 28 may be included in the transmitting conductors 26 of the talking circuit to exclude voice frequencies in the range of the pilot frequency and prevent possible false operations of the pilot controlled circuits.

The telephotograph and talking equipment at subscriber's station 18 is identical with that at subscriber's station 10 and the several elements are identified by the same reference characters.

At the telephone central office 13, the subscriber's sending loop 11 is connected to the broad-band facility 14 in parallel with a pilot oscillator through a hybrid coil 30 including a balancing network 31. Only moderate balance is required in the hybrid coil, the function of which is to prevent current from the pilot oscillator 29 flowing back into the picture sending equipment 19 and current from the picture sending equipment 19 flowing into the pilot oscillator 29. The oscillator 29 is further protected from the higher level picture sending current by a narrow band filter 32 which also excludes any undesired frequency components in the current output of oscillator 29. The picture sending current and the pilot current in the line side of the hybrid coil 30, are used to modulate the carrier of the selected channel of the broad-band facility 14.

In the illustrative embodiment of the invention now being described, the frequency of the pilot current from oscillator 29 is 3145 cycles. This frequency was chosen for several reasons. It is necessary to use a pilot frequency sufficiently above the picture band of 1200 to 2600 cycles to permit of its separation from the picture current by filters which are practical to build and sufficiently below the cut-off frequency of about 3300 cycles of the voice channel of the broad-band facility so that the delay distortion of the line facility will not be large. By a suitable design of the picture current filters, a pilot frequency below the band of frequencies used for picture transmission might be used to avoid any possible disadvantages due to line cut-off. The pilot frequency of 3145 cycles is obtainable in commercial systems from the carrier sources of carrier telegraph systems thereby obviating the necessity of a pilot oscillator individual to the telephotograph equipment. The use of a pilot frequency above the speech band permits transmission of the pilot at all times and simplifies the switching requirements of the system.

After passing over the broad-band facility 14, the picture and pilot currents are separated at the telephone central office 15 by the band elimination filter 35 and the high pass filter 36, respectively. The filter 35 may alternately be a low pass or a band pass filter. After passing through the filter 36, the pilot current is amplified in an amplifier 37 and rectified by a copper oxide rectifier 38. A low pass filter 39 filters out the pilot current and its harmonics and passes the direct current. The direct current is applied to a variable losser 40 (shown within the dotted line box) in such a way as to control the amount of loss in signal level sustained by the picture currents in passing therethrough. The picture currents pass through the filter 35 and the variable losser 40 to an amplifier 41 which raises their level to a value suitable for transmission over the subscriber's receiving loop 16 to the subscriber's telephotograph receiving equipment 22 at the subscriber's station 18.

In the illustrative embodiment of the invention being described, the variable losser 40 comprises an input transformer 42, an output transformer 43 and a direct current loss control connection comprising conductors 44 and 45. The output winding of transformer 42 is connected to the input winding of transformer 43 by resistors 46, 47, 48 and 49. A copper oxide varistor bridge 50 is connected between the junction points of resistors 46 and 47 and the junction points of resistors 48 and 49. The conductors 44 and 45 are connected to the other terminals of the bridge 50.

An adjustable direct current biasing voltage for the variable losser 40 is provided by a potentiometer 51 and battery 52. This biasing voltage is connected in aiding relationship to the direct current voltage at the output terminals 53 and 54 of the low pass filter 39. The resulting combined direct current voltage is impressed on the direct current loss control connection comprising conductors 44 and 45.

When the gain of the broad-band facility is normal, the direct current voltage from the rectifier 38 added to the biasing voltage of potentiometer 51 holds the loss of the variable losser 40 at the proper value. If the circuit gain rises, say 1 db, the current through the control conductors 44 and 45 will increase and the positive voltage applied to the variable losser 40 will increase just enough to reduce the gain 1 db. In this way, the effective current delivered to the subscriber's receiving loop 16, remains just what it would have been if the gain of the broad-band facility had not changed. If the gain of the broad-band facility decreases, the opposite effect occurs, that is, the positive direct current voltage applied to the variable losser 40 is reduced thereby reducing the loss in the variable losser by the right amount to offset the reduction in gain of the broad-band facility.

The action of the variable losser will now be described. The rectified pilot current normally supplies a positive voltage at X in the variable losser 40 of such value that the loss through the variable losser is the desired amount. When the gain of the line circuit increases, the voltage difference between X and Y increases and the effect of this is to lower the shunting impedance between C and D. This action will increase the loss to picture currents traversing the resistors 46, 47, 48 and 49 in the variable losser 40 thereby compensating for the increase in gain. For a decrease in circuit gain, the direct current voltage between X and Y decreases and the impedance between C and D increases thereby producing a smaller loss in the picture current.

In order to effect compensation over a considerable range of variations in gain, the elements of the circuit must be suitably matched and adjusted. This may be accompalished by varying the level of the incoming picture and pilot currents in a manner which will simulate changes in gain or loss of the line and measuring the resulting changes in output of amplifier 41. If the output of amplifier 41 varies more than, say, 0.15 db for a line change of +5 db the gain adjustment of amplifier 37 and the setting of potentiometer 51 are changed slightly until this assumed requirement of constancy of output is realized. A simple test circuit, which is made a part of the equipment, is designed to facilitate the adjustments just described.

Similar equipment (not shown) is provided for transmission in the opposite direction, that is, for transmission from the subscriber's station 18 over subscriber's sending loop 17, through sending equipment at telephone central office 15, over the broad-band facility 14, through the receiving equipment at the telephone central office 13, over the subscriber's receiving loop 12 to the receiving equipment at subscriber's station 10.

For the most satisfactory operation of this system, the time of passage of a control signal through filter 36, amplifier 37, rectifier 38 and filter 39 to the direct current control conductors 44 and 45 should be the same as the time of passage of the level change pulse through filter 35 and in both circuits the delay distortion over the band of frequencies important in building up the pulse should be small.

Obvious modifications in the specific circuits and the elements thereof may be made to fit the requirements of specific telephotograph equipment and broad-band facilities being used wtihout departing from the purview of the appended claims.

What is claimed is:

1. A telephotograph system comprising a voice frequency carrier transmission channel at the terminal of which appear abrupt changes in amplitude of transmitted signals due to uncontrolled operating changes, means to impress telephotograph signals on said channel at a transmitting station, means to impress a constant amplitude pilot frequency on said channel also at said transmitting station, means at a receiving station to produce a picture under control of telephotograph signals received from said transmission channel, a filter which passes the telephotograph signals and suppresses the pilot frequency located between said transmission channel and said picture producing means, a quick-acting variable attenuator comprising copper oxide rectifier elements inserted between said filter and said picture producing means, and means to control said attenuator in accordance with the amplitude of the pilot frequency as received from said transmission channel comprising a filter which passes said pilot frequency and suppresses said telephotograph signals, a copper oxide rectifier adapted to produce unidirectional current proportional to the amplitude of said received pilot frequency, a low-pass filter adapted to pass said unidirectional current and suppress said pilot frequency, and means to impress said unidirectional current from said filter upon said attenuator in such a manner as to maintain the ratio of the amplitudes of the received and transmitted telephotograph signals substantially constant at all times during the production of a picture regardless of changes in the intervening transmission medium.

2. A telephotograph system comprising a voice frequency carrier transmission channel at the terminal of which appear abrupt changes in amplitude of transmitted signals due to uncontrolled operating changes, means to impress telephotograph signals on said channel at a transmitting station, means to impress a constant amplitude pilot frequency on said channel also at said transmitting station, means at a receiving station to produce a picture under control of telephotograph signals received from said transmission channel, a filter which passes the telephotograph signals and suppresses the pilot frequency located between said transmission channel and said picture producing means, a quick-acting variable attenuator comprising copper oxide rectifier elements inserted between said filter and said picture producing means, and means to control said attenuator in accordance with the amplitude of the pilot frequency as received from said transmission channel in such a manner as to maintain the ratio of the amplitudes of the received and transmitted telephotograph signals substantially constant at all times during the production of a picture regardless of changes in the intervening transmission medium.

3. A telephotograph system comprising a voice frequency channel of a broad-band transmission facility which facility includes a plurality of voice carrier channels and amplifiers common thereto each voice channel being adapted to transmit ringing current thereover and having switching apparatus associated therewith, means to impress telephotograph signals on said channel at a transmitting station, means to impress a constant amplitude pilot current of a frequency within the frequency transmission band of said voice frequency channel also at said transmitting station, means at a receiving station to produce a picture under control of telephotograph signals received from said transmission channel, a filter which passes the telephotograph signals and suppresses the pilot frequency located between said transmission channel and said picture producing means, a quick-acting variable attenuator comprising copper oxide rectifier elements inserted between said filter and said picture producing means, and means to control said attenuator in accordance with the amplitude of the pilot frequency as received from said transmission channel in such a manner as to maintain the ratio of the amplitudes of the received and transmitted telephotograph signals substantially constant at all times during the production of a picture regardless of changes in the intervening transmission medium.

4. A telephotograph system comprising a voice frequency carrier transmission channel at the terminal of which appear abrupt changes in amplitude of transmitted signals due to uncontrolled operating changes, means to impress telephotograph signals on said channel at a transmitting station, means including a hybrid coil and filter to impress a constant amplitude pilot frequency on said channel at said transmitting station, means at a receiving station to produce a picture under control of said telephotograph signals received from said transmission channel, a filter which passes the telephotograph signals and suppresses the pilot frequency located between said transmission channel and said picture producing means, a quick-acting variable attenuator comprising copper oxide rectifier elements inserted between said band-pass filter and said picture producing means, and means to control said attenuator in accordance with the amplitude of the pilot frequency as received from said transmission channel in such a manner as to maintain the ratio of the amplitudes of the received and transmitted telephotograph signals substantially constant at all times during the production of a picure regardless of changes in the intervening transmission medium.

5. A telephotograph system comprising a subscriber's telephotograph sending station, a transmission channel adapted to transmit telephotograph signals received from said sending station, means to impress a constant amplitude pilot frequency on said transmission channel along with said telephotograph signals for control purposes, a telephone talking circuit, means to impress talking currents from said talking circuit on said transmission channel also simultaneously with said pilot frequency, and means to suppress the frequency components of the talking currents which lie within a range of frequencies including said pilot frequency.

6. A telephotograph system comprising a subscriber's telephotograph sending station, a transmission channel adapted to transmit telephotograph signals received from said sending station, means to impress a constant amplitude pilot frequency on said transmission channel along with said telephotograph signals for control purposes, a telephone talking circuit, and means to impress talking currents from said talking circuit on said transmission channel also simultaneously with said pilot frequency in place of said telephotograph signals, and a filter at said subscriber's station traversed by talking currents from said talking circuit to suppress the frequency components from the talking currents which lie within a range of frequencies including said pilot frequency.

WALTER A. PHELPS.

REFERENCES CITED

The following references are of record in the file of this patent:

UNITED STATES PATENTS

| Number | Name | Date |
|---|---|---|
| 1,680,390 | Nyquist | Aug. 14, 1928 |
| 1,737,503 | Kupfmuller et al. | Nov. 26, 1929 |
| 2,100,375 | Blair | Nov. 30, 1937 |
| 2,102,138 | Streiby | Dec. 14, 1937 |
| 2,129,074 | Thierbach | Sept. 6, 1938 |
| 2,140,492 | Black | Dec. 20, 1938 |
| 2,140,900 | Dixon | Dec. 20, 1938 |
| 2,140,915 | Kreer | Dec. 20, 1938 |
| 2,212,832 | Holzer | Aug. 27, 1940 |
| 2,328,951 | Bryant | Sept. 7, 1943 |
| 2,343,634 | Baldwin | Mar. 7, 1944 |
| 2,379,744 | Pfleger | July 3, 1945 |
| 2,465,531 | Green | Mar. 29, 1949 |
| 2,488,577 | Bonner | Nov. 22, 1949 |